Jan. 5, 1965     A. F. DYER ETAL     3,164,359
SAFETY FLOW VALVE

Filed Oct. 10, 1960     3 Sheets-Sheet 1

INVENTORS
A. F. DYER
E. E. REED
R. J. BENNETT
BY
ATTORNEYS

Jan. 5, 1965     A. F. DYER ETAL     3,164,359
SAFETY FLOW VALVE

Filed Oct. 10, 1960     3 Sheets-Sheet 2

INVENTORS
A. F. DYER
E. E. REED
R. J. BENNETT
BY
ATTORNEYS

INVENTORS
A. F. DYER
E. E. REED
BY R. J. BENNETT

ATTORNEYS 3,164,359
SAFETY FLOW VALVE
Alvah F. Dyer, Caney, Kans., and Edwin E. Reed and Richard J. Bennett, Bartlesville, Okla., assignors to Phillips Petroleum Company, a corporation of Delaware
Filed Oct. 10, 1960, Ser. No. 61,413
9 Claims. (Cl. 251—68)

This invention relates to a safety flow valve. In one aspect this invention relates to a combination safety flow valve and storage container assembly. In another aspect this invention relates to a combination of dispensing apparatus comprising said safety flow valve and storage container assembly.

In the handling of volatile fluids, such as liquefied petroleum gas and liquid ammonia, many safety requirements must be met. For example, such materials must be stored in especially constructed tanks which are capable of withstanding the relatively high vapor pressures of these materials. When introducing such a material into the container or removing it therefrom, it is necessary that the valve structure employed in such systems be provided with a number of safety features.

The present invention provides a valve structure wherein a number of the necessary safety features are combined in a single compact valve structure. Said valve structure is particularly adapted to be employed in tanks or containers mounted on transport trucks handling volatile fluids such as liquefied petroleum gas and liquid ammonia. For example, in one embodiment there is incorporated in said valve structure means for holding the valve open which can be incorporated or connected into the braking system of the transport truck in such a manner that the valve will close automatically when the operator releases the truck brakes. The operator can close the valve at will without releasing said brakes but the valve will not remain in an open position without setting the brakes of the vehicle.

An object of this invention is to provide a safety flow valve structure provided with means for holding the valve open under normal operating conditions only. Another object of this invention is to provide a safety flow valve structure which will fail safe, i.e., close automatically upon damage to said valve structure. Another object of the invention is to provide a safety flow valve structure which will fail safe in the event of fire in the vicinity of said valve structure and conduits connected thereto. Another object of the invention is to provide a safety flow valve structure which has a positive shut-off action under either normal operating conditions or under emergency conditions. Another object of the invention is to provide a safety flow valve structure which can be essentially internally mounted within a storage container with its shut-off valve substantially level with the bottom of said container, thus protecting said shut-off valve from damage due to mechanical shock and providing for essentially complete withdrawal of the stored product from said container. Another object of the invention is to provide a safety flow valve structure which is simple in construction, reliable in operation, and economical to manufacture. A further object of this invention is to provide a dispensing apparatus comprising the safety flow valve structure of the invention mounted in a storage container which in turn is mounted on a transport vehicle. Other aspects, objects, and advantages of the invention will be apparent to those skilled in the art in view of this disclosure.

Figure 4:
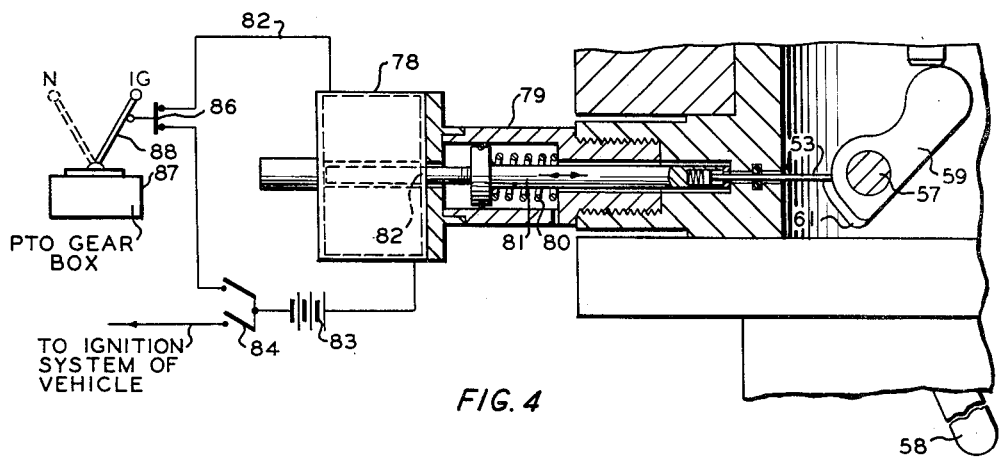

FIGURE 4 is a schematic illustration of one modification of the invention illustrating an embodiment of the valve holding means of the invention which can be employed to render a fluid dispensing system comprising a mobile vehicle, having mounted thereon a storage container having installed therein the safety flow valve structure of the invention, inoperative except when said vehicle is non-mobile.

Figure 5:
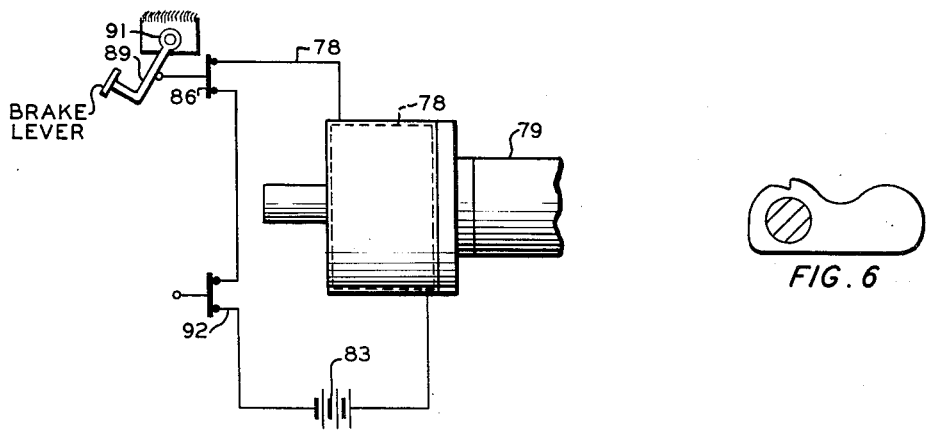

FIGURE 5 is a schematic illustration of another modification of the invention wherein the valve holding means of the invention can be employed to render a fluid dispensing system comprising a mobile vehicle, having mounted thereon a storage container having installed therein the safety flow valve structure of the invention, inoperative except when said vehicle is in a nonmobile condition.

Figure 6:
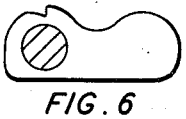

FIGURE 6 illustrates a modification of one element of the valve holding means of the invention.

Figure 1:
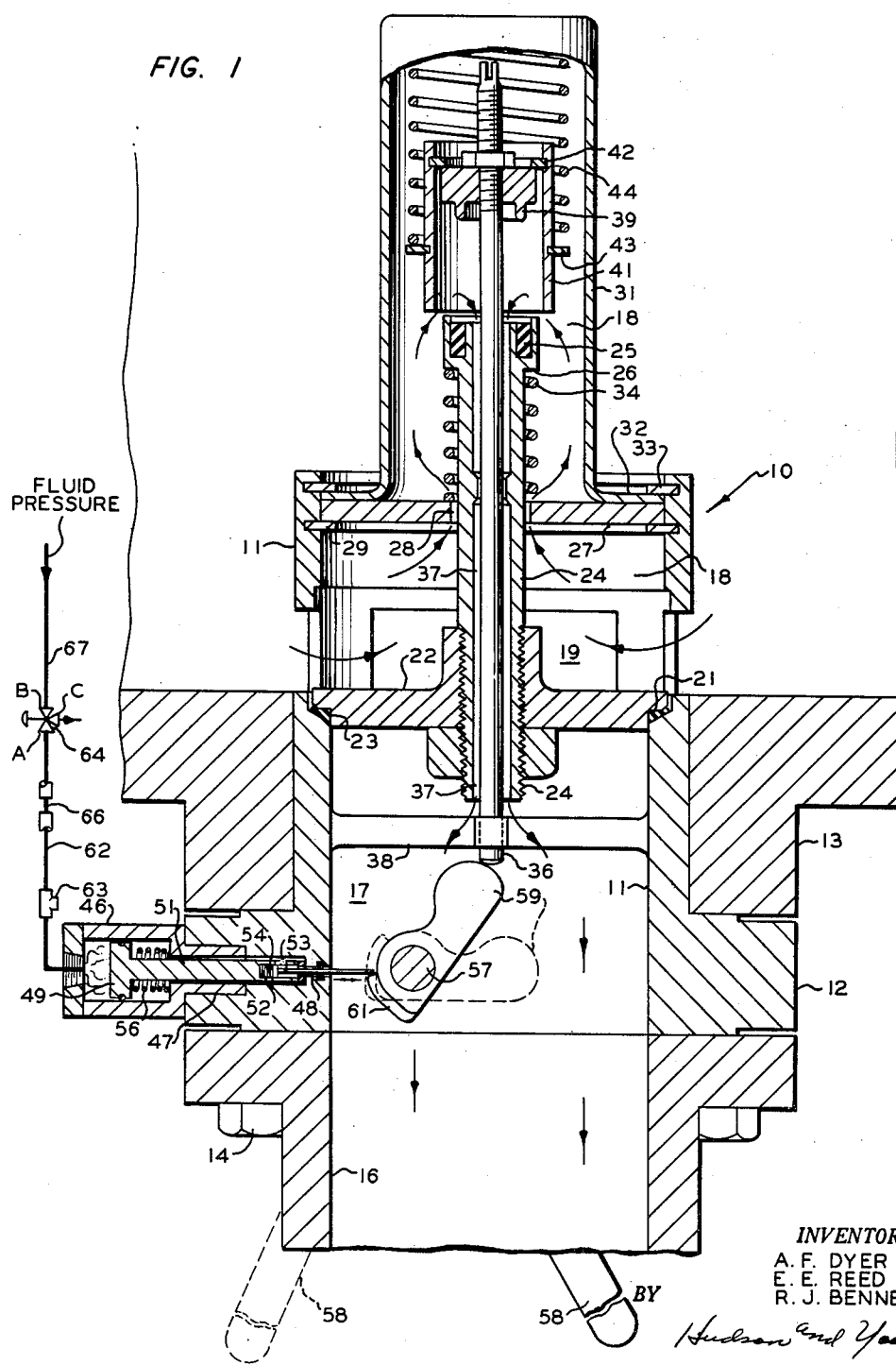
FIGURE 1 is a diagrammatic view, partly in cross section, of one embodiment of the safety flow valve structure of the invention.

Referring now to the drawings wherein like reference numerals are employed to denote like elements, the invention will be more fully explained. In FIGURE 1 there is shown a safety flow valve structure in accordance with the invention, designated generally by the reference numeral 10, which is particularly adapted to be employed in the handling of volatile liquids such as liquefied petroleum gas or liquid ammonia. Said valve structure comprises a generally tubular valve body 11 having means, such as a flange 12, at one end thereof for securing said valve body 11 to a container, such as tank 13, in such a manner that a substantial portion of said valve body is positioned within said container. Stud bolts 14 can be employed for bolting said flange to said tank in which case a suitable gasketing material (not shown) will be employed between said flange and said tank. While a flange has been illustrated as the means for securing said valve body 11 to said tank 13, it will be understood by those skilled in the art that valve structures having a lower threaded end can be employed in tanks provided with threaded openings therein, and such valve structures are within the scope of the invention. As shown in FIGURE 1, a product conduit 16 connects with said valve body 11 as the bottom thereof and said stud bolts 14 are employed to connect both product conduit 16 and flange 12 of valve body 11 to said tank 13. Said product conduit can comprise a length of pipe or preferably can be the suction side of a dispensing pump, i.e., the pump can be connected directly to the valve structure.

A first chamber 17 is formed within said valve body adjacent said one end which is provided with flange 12. A second chamber 18 is formed within said body adjacent said first chamber but removed from said flange 12. Said second chamber is provided with openings 19 in the wall thereof. A valve seat 21 is disposed intermediate said first and second chambers. A valve head 22 is disposed in said second chamber 18 and is adapted to engage said valve seat 21. Said valve head is provided with an annulus of resilient sealing material 23 which extends around the lower periphery thereof. A hollow valve stem 24 is slidably mounted in said second chamber and attached to said valve head 22 by any convenient means such as the threads shown, and extends through said valve head. Said valve stem is provided with an enlarged upper end which forms a shoulder 26. An annulus 25 of a resilient material is disposed in said enlarged upper end to form a valve seat for bleed valve 39 described hereinafter.

A plate 27 extends transversely across and divides said second chamber into an upper first section and a lower second section. Said plate 27 is provided with an opening 28 therein and said valve stem 24 is slidably mounted in said opening. Said plate 27 rests upon a first expandable annular retainer 29 which fits into a recess in the inner wall of valve body 11. Mounted immediately above said plate 27 is a cap 31 provided with a flange 32 at its lower end which rests on said plate 27. Said flange 32 and said plate 27 are held in place by means of a second expandable annular retainer 33 which also fits into a recess in the inner wall of valve body 11. Thus, said plate 27 and said cap 31 are securely held to and become, in effect, a portion of said valve body 11. It is believed clear that the cap and retainer ring structure just described is only one form of structure which can be employed as the upper portion of valve body 11. For example, said valve body 11 could be extended upwardly and suitably divided at about the position of said retainer rings 29 and 33 and connected with flanges.

A first spring 34 is mounted around said stem 24 and acts between said shoulder 26 and said plate 27 to normally bias said valve head 22 out of engagement with said valve seat 21. Since said plate 27 is in effect a part of valve body 11, it can be said that said spring 34 acts between said valve stem 24 and said valve body 11.

A valve shaft 36 extends from within said first chamber 17 to within the upper section of said second chamber 18. Said shaft extends slidably through said valve head 22 and hollow valve stem 24 with a clearance which provides a bleed passage 37 connecting said first and second chambers. The lower end portion of said shaft 36 extends slidably through and is supported by supporting spider 38 disposed in said first chamber 17 and secured to the inner wall of said valve body 11.

A bleed valve 39 is threaded onto the upper end portion of said shaft 36. A cylindrical spring guide 41, provided with a removable expandable retainer ring 42 mounted in a recess in the inner wall thereof, surrounds said bleed valve 39. Said spring guide rests on and acts against said bleed valve by means of said retainer ring 42. A spring keeper 43, comprising a removable expandable retainer ring, is mounted in a recess in the outer wall of said spring guide 41. A second spring 44 is mounted around said spring guide 41, rests on said spring keeper 43, and acts between said spring keeper and the upper end of said cap 31 to normally bias said valve head 22 into engagement with said valve seat 21. Since said spring guide 41 and spring keeper 43 are, in effect, attached to and a part of said shaft 36 it can be said that said second spring 44 acts between said shaft 36 and valve body 11 to normally bias said valve head 22 into engagement with said valve seat 21 because the force of spring 44 will urge bleed valve head 39 into engagement with bleed valve seat 25 on the upper end of stem 24. Since said spring 44 is heavier and stronger than spring 34, valve stem 24 will be urged downwardly and valve head 22 will engage valve seat 21. The arrangement just described thus provides a "lost motion" connection between said shaft 36 and valve stem 24 in that when said shaft is raised there is no connection between said shaft and said stem. However, when spring 44 forces said shaft downwardly to its normal position, said stem is also moved downwardly. It will be noted that the tension of said spring 44 can be varied or adjusted by moving bleed valve 39 on the threaded end of shaft 36.

Figure 2:
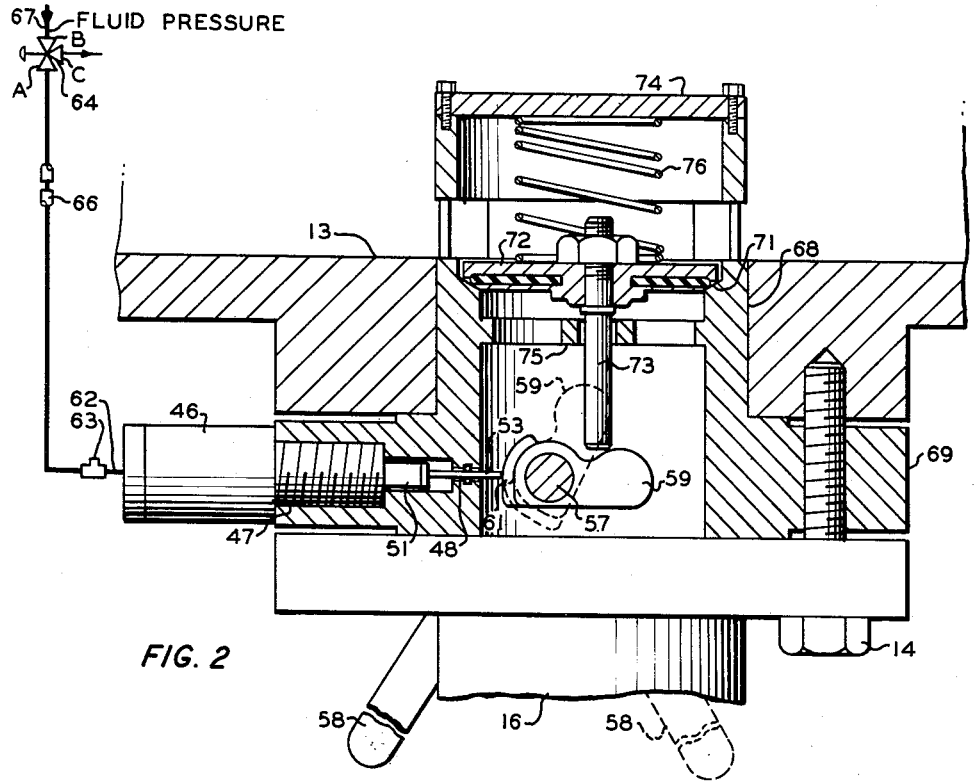
FIGURE 2 is a diagrammatic view, partly in cross section, of another embodiment of the safety flow valve structure of the invention.

The valve holding means of the invention, which comprises a part of the valve structure of the invention, comprises a cylinder 46 fitted into a recess 47 provided in the outer wall of said valve body 11 adjacent said one end thereof. In the embodiment illustrated in FIGURE 1 said cylinder can be conveniently threaded into said flange 12, similarly as shown in FIGURE 2 and as shown for cylinder 79 in FIGURE 4. A port 48 extends from said recess 47 into said first chamber 17 formed within said valve body. A fluid actuated piston 49 is slidably disposed in said cylinder 46. A plunger 51 is attached at one end to one side of said piston with the other end of said plunger extending without said cylinder into said recess. A cavity 52 is provided in the extended end of said plunger and a pin 53, having an enlarged head on one end thereof, is mounted with said enlarged head in said cavity and with the other end extending from said cavity and through said port 48 into said first chamber 17 in said valve body. A spring 54 is disposed within said cavity for biasing said pin to an extended position. Another spring 56 is mounted around said plunger within said cylinder and acts between one side of said piston and said cylinder to normally bias said piston, plunger and pin assembly to a retracted position.

The valve operating means comprises a rod 57 rotatably mounted in the wall of said valve body 11 adjacent said flanged end thereof with one end of said rod being within said valve body and adjacent the lower end of said shaft 36. The other end of said rod is without said valve body and has a lever arm 58 attached thereto for rotating said rod 57. A cam 59 is mounted on the end of said rod 57 which extends into valve body 11. It will be noted that said cam 59 engages the lower end of said shaft 36. Said cam 59 is provided with an indexing means which, as here illustrated, comprises a boss 61 on the one end thereof which is adjacent the end of said pin 53.

A first conduit 62 is connected to and opens into said cylinder 46 on the side of said piston 49 away from said plunger 51. A fusible plug 63 is disposed in said first conduit. A three-way valve 64, having ports A, B, and C, and adapted to permit flow through ports A and B only or through ports A and C only, is disposed in said first conduit. An orifice 66 is disposed in said first conduit between said three-way valve 64 and said fusible plug 63. A fluid pressure conduit 67 is connected into port B of said three-way valve.

While the holding means of the invention is particularly adapted to be employed on a valve structure which in turn is particularly adapted to be employed in apparatus for handling volatile fluids such as liquefied petroleum gas or liquid ammonia, said holding means is not necessarily limited to such use. Thus, in FIGURE 2 there is illustrated a valve structure incorporating the holding means of the invention, which valve structure is adapted to be employed in apparatus for handling comparatively nonvolatile fluids, e.g., kerosene or jet fuels. The valve structure of FIGURE 2 comprises a generally tubular valve body 68 having means such as flange 69 at one end thereof for securing said valve body in a tank or container such as tank 13. A valve seat 71 is disposed within said valve body. A valve head 72, provided with a resilient seating surface is also disposed within said valve body and is adapted to engage said valve seat 71. A valve shaft 73 is attached to said valve head and extends downwardly therefrom into the lower end of said valve body where it is slidably supported and guided by spider 75. The upper end of said valve body 68 is closed by means of a closure plate 74 held in place by means of the stud bolts shown. A spring 76 is disposed between said valve head 72 and said closure plate 74 and serves to normally bias said valve head into engagement with said valve seat 71. A rod 57, having a cam 59 mounted on one end thereof and a lever 58 mounted on the other end thereof, is rotatably mounted in the lower end of said valve body with said cam engaging the lower end of said shaft 73 in the same manner as described in connection with FIGURE 1. The holding means comprising cylinder 46 and pin 53 is like that previously described in connection with FIGURE 1.

Figure 3:
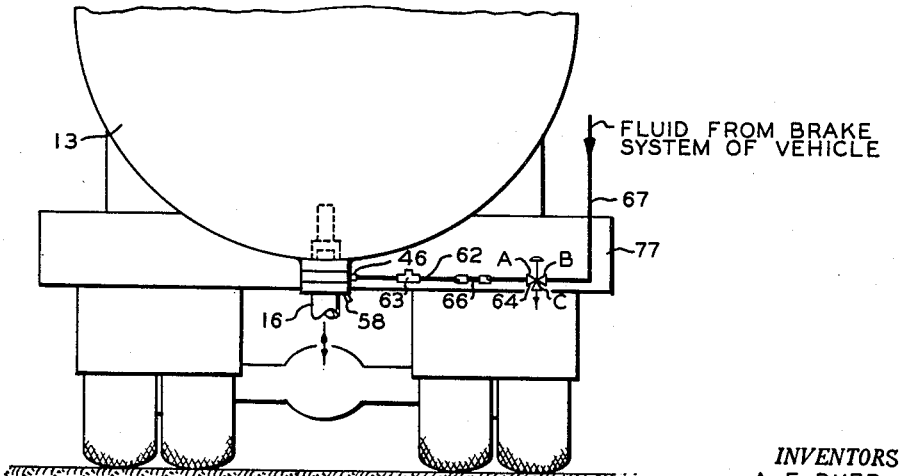
FIGURE 3 is a schematic illustration of a combination safety flow valve and storage container assembly in accordance with the invention.

Referring now to FIGURE 3, there is illustrated a valve and storage container assembly in accordance with the invention wherein said valve structure is secured to a container or tank 13 in such manner that a substantial portion of said valve structure is positioned within said container. Said container 13, as here illustrated, is a tank mounted on the bed or frame 77 of a transport truck having self-propulsion means. Said container 13 can also be any other suitable container such as a railroad tank car, or a stationary storage tank. When the valve structure 10 of FIGURE 1 is installed in a container, such as container 13, opening 19 is an opening from within valve body 11 into the interior of said container 13. In such an assembly mounted on a mobile truck having self-propulsion means, conduit 67 becomes a conduit extending from the brake fluid system of the vehicle. Brake fluid passed through said conduit 67 when thus connected to the brake system of the vehicle is operable, in combination with three-way valve 64 and the holding means of the invention comprising cylinder 46, to render an apparatus such as that of FIGURE 3 inoperative except when the transport truck on which it is mounted has been rendered non-mobile. Said conduit 67 is connected into the braking system in such manner that it is pressurized only when the brakes are in braking position, e.g., it is connected into said braking system downstream of the valve or other means operated by the brake foot pedal and/or hand lever and controlling flow of air from the brake air tank, or flow of hydraulic braking fluid from the hydraulic fluid tank, to the brakes of said vehicle.

The combination of apparatus illustrated in FIGURE 4 provides another means for rendering an apparatus such as that of FIGURE 3 inoperative except when said transport truck has been rendered non-mobile. In FIGURE 4 a solenoid 78 is connected to a cylinder 79 which is essentially like cylinder 46 of FIGURES 1 and 2 and which is fitted into a recess and port in the wall of the valve body in the same manner as said cylinder in said FIGURES 1 and 2. A plunger 81 is disposed in said cylinder and is attached at one end to one end of core rod 82 of solenoid 78. The other end of said plunger 81 is provided with a cavity and pin assembly essentially like that described in connection with FIGURES 1 and 2 with the pin 53 thereof extending into the valve body as described in connection with FIGURES 1 and 2. A circuit 82 connects said solenoid 78 with battery 83 and ignition switch 84 of said vehicle. A second switch 86 is disposed in said circuit 82 and is adapted to be actuated to a closed position when the power take-off gears in power take-off gear box 87 are in an in-gear position. As shown in FIGURE 4, said switch 86 would be mounted adjacent the PTO gear shift lever 88 and when said gear shift lever is in an in-gear position, as shown, it would engage said switch 86 causing it to be in the closed position. Obviously, said switch 86 could be located within gear box 87. FIGURE 4 is intended to be a schematic illustration only. Those skilled in the art can devise other suitable arrangements of the apparatus illustrated in view of this disclosure.

In FIGURE 5 there is illustrated another combination of apparatus for rendering an apparatus such as that of FIGURE 3 inoperative except when the transport vehicle is in a non-mobile condition. The apparatus of FIGURE 5 is like that of FIGURE 4 except that switch 86 is mounted adjacent brake lever 89 and is adapted to be actuated to a closed position when said brake lever is in a braking position so as to energize said solenoid 78 and move said core rod, plunger and pin assembly to a projected position with said pin in holding engagement with the indexing means on cam 59. Said brake lever 89 can be a foot brake pedal, or hand brake lever and is suitably mounted on the vehicle at 91 in any conventional manner. Switch 92 is provided in circuit 78 for manual operation by the operator as explained further hereinafter.

FIGURE 6 illustrates another type of cam element which can be employed in the apparatus of the invention. Instead of a boss on the surface of one end of the cam with one shoulder of said boss serving as an indexing means, there is provided a slot or recess in the surface of the cam. It is believed clear that the pin 53 of the holding means will engage said slot or recess when said pin is moved to its projected position and said cam is rotated as described above. The cam element illustrated in FIGURE 6 is less preferred than that illustrated in FIGURES 1 and 2 because of the danger of rotating said cam too far and damaging pin 53 which will be engaged in the slot or recess shown. This danger can be lessened by providing a stop on lever 58 or rod 57 to prevent too much rotation of said rod 57.

In operation of the apparatus of FIGURE 3, assuming that the vehicle has been driven to its unloading spot and properly parked with the brakes applied, fluid from the braking system will pass through conduit 67 to three-way valve 64. According to one method of operation, said three-way valve would normally be in the position permitting flow through ports A—C only, port B would be blocked and the braking fluid could go no further. The operator after parking the vehicle would normally then make the proper connections such as connecting the unloading hose, etc. to product conduit 16. Said operator would then switch three-way valve 64 to its position permitting flow through ports A—B only which would permit brake fluid to enter cylinder 46, actuate piston 49, and move plunger 51 and pin 53 to a projected position placing pin 53 against boss 61 on cam 59. The apparatus is now ready for opening of the valve so that unloading operations can begin.

Assuming that the valve structure of FIGURE 1 has been installed in the storage container 13 of FIGURE 3, when lever handle 58 is rotated, cam 59 attached to rod 57 will be rotated and the pressure of said cam on the lower end of shaft 36 will move said shaft upwardly to the position shown in FIGURE 1. Prior to said movement of shaft 36, bleed valve 39 was in engagement with seating surface 25 in the upper end of stem 24, thus closing bleed passage 37. Upon said movement of shaft 36 said bleed valve 39 is moved to the position shown and opens said bleed passage 37 connecting first chamber 17 and second chamber 18. This permits flow from within tank 13, through opening 19, passage 28 in plate 27, the upper section of second chamber 18, and then down through bleed passage 37 into first chamber 17. Prior to the opening of said bleed passage 37, the pressure within said container 13 bearing against the upper surface of valve head 22, and being greater than the force exerted by spring 34, serves to hold said valve head into engagement wtih valve seat 21. However, upon the opening of said bleed passage 37 and thus connecting said first chamber 17 and said second chamber 18, the pressures within said first chamber 17 below valve head 22 and second chamber 18 above valve head 22 are equalized, and the spring 34 acting between plate 27 and shoulder 26 on stem 24 will cause said valve head 22 to be lifted from engagement with valve seat 21. The valve is now open and unloading can proceed in normal manner.

When the unloading operations are finished, the operator can close the valve at will by switching three-way valve 64 from its position permitting flow through ports A—B to its position permitting flow through ports A—C. This will block port B, and will vent the pressure from cylinder 46 causing the piston, plunger and pin assembly to be retracted and move pin 53 from engagement with the indexing means on cam 59. The valve will then close because spring 44 is heavier and stronger than spring 34 and the force of spring 44 will be transmitted through bleed valve 39 to the upper end of stem 24.

If for any reason the brake system should fail during the unloading operation, i.e., be vented, or if the operator should absentmindedly release the brakes, which would also vent cylinder 46, and attempt to move the vehicle, the valve will automatically close and thus avoid possible loss of the contents of container 13.

When a valve structure similar to that of FIGURE 2 is installed in the container 13 of FIGURE 3, it is believed the operation of the assembled apparatus will be clear in view of the description of the valve of said FIGURE 3. It is believed clear the valve of FIGURE 2 is a direct opening valve, i.e., it opens directly upon the application of force to the lower end of shaft 73. The holding means of the invention engages cam 59 in the same manner as described above and functions in the same manner to maintain the valve in open position only when the vehicle is in a non-mobile condition.

The apparatus of FIGURES 1, 2, and 3, as here illustrated, are designed for use on vehicles having air brakes, said apparatus can be adapted for use on vehicles having hydraulic brakes by providing a return conduit from port C of three-way valve 64 to the hydraulic fluid reservoir.

In an alternative, and frequently preferred, method of operating the apparatus of FIGURE 3, three-way valve 64 would normally be in the position permitting flow through ports A—B only, with port C being normally blocked.

In this method of operation, application of the brakes, as upon parking of the vehicle, would cause flow of brake fluid through said ports A—B only to enter cylinder 46, actuate piston 49, and move plunger 51 and pin 53 to a projected position placing pin 53 against boss 61 on cam 59. The operator would then proceed to make the proper connections for unloading, such as connecting the unloading hose, etc. to product conduit 16. Upon completing said connections the apparatus is then ready for opening of the main valve so that unloading operations can begin. Said main valv is opened in the manner previously described by rotation of lever handle 58.

When the unloading operations are finished, as when tank 13 has been emptied, the unloading hose is disconnected and any other steps necessary to render the vehicle ready for travel are taken. Upon release of the brakes preparatory to moving said vehicle, pressure will be vented from cylinder 46 through the regular brake system vent and the valve will automatically close as previously described.

In said alternate method of operation port C of said three-way valve 64 is used by the operator as an emergency vent only. Thus the return conduit from port C to the hydraulic fluid reservoir, referred to above, would not be needed.

In the operation of the apparatus of FIGURE 4, assuming the transport truck has been driven and parked in its unloading position and all other unloading preparations such as the connection of the unloading hose has been completed, ignition switch 84 will be closed to start the engine of the vehicle in order to operate the power take-off to drive the discharge pump which is mounted on the vehicle for discharging the tank contents through product conduit 16. After said engine has been started, gear shift lever 88 will be shifted into the in-gear position as shown in the drawing, solenoid 78 will be energized and will overcome the biasing action of spring 80 causing the plunger and pin assembly to be moved to a projected position with pin 53 engaging boss 61 on cam 59. When lever 58 is then rotated to rotate rod 57 and cam 59 to move shaft 36 in FIGURE 1 or shaft 73 in FIGURE 2 to a valve opening position, the pin 53 will engage the shoulder of boss 61 and hold said valve in an open position so long as switch 86 is closed and solenoid 78 is energized. Upon completion of the unloading operation, gear shift lever 88 will be shifted into the neutral position, breaking circuit 82 at switch 86, solenoid 78 will be de-energized and spring 80 around plunger 81 will move the plunger and pin assembly to a retracted position, moving said pin 53 from engagement with cam 59 and the valve will automatically close. It will be understood that the vehicle in the apparatus of FIGURE 4 is the type that when the power take-off gears are in operation, the normal driving gears are inoperable.

The operation of the apparatus illustrated in FIGURE 5 is similar to that illustrated in FIGURE 4. When the vehicle has been driven to its unloading position and parked, application of the brakes through brake lever 89 will close switch 86. Switch 92 is provided for manual operation by the operator. After all unloading preparations such as connecting the unloading hose have been completed, the operator will close said switch 92, solenoid 78 will be energized to overcome the biasing action of spring 80 causing the plunger and pin assembly to be moved to a projected position with pin 53 engaging boss 61 on cam 59. When lever 58 is then rotated to rotate rod 57 and cam 59 to move shaft 36 in FIGURE 1 or shaft 73 in FIGURE 2 to a valve opening position, the pin 53 will engage the shoulder of boss 61 and hold said valve in an open position so long as switch 92 is closed and solenoid 78 is energized. Upon completion of the unloading operation the operator can cause the valve to close by manually opening switch 92; solenoid 78 will then be de-energized and spring 80 around plunger 81 will move the plunger and pin assembly to a retracted position, moving said pin 53 from engagement with cam 59 and the valve will automatically close. Said valve will close in the same manner if the circuit to solenoid 78 is broken at switch 86 by release of the brakes.

It is believed the advantages of valve structures having the holding means of the invention incorporated therein, and the other apparatus combinations of the invention, will be apparent to those skilled in the art from the above description of their operation. The invention provides a valve structure wherein the valve will close automatically when an attempt is made to move the vehicle. It is believed clear that any damage to conduit 67, conduit 62, cylinder 46, or solenoid 78 causing a failure of said apparatus will cause the valve to automatically close. For example, if conduit 62 is ruptured in any manner, such action would cause the venting of cylinder 46 which will automatically cause the valve to close and unloading operations will cease. Likewise, in the event of a fire in the vicinity of the valve or conduit 62, fusible plug 63 will release the contents of conduit 62 faster than it can be repressured through orifice 66. Release of said fusible plug 63 will of course vent cylinder 46 and cause the valve to close in the manner previously described.

It is preferred that the valve structures of the invention be positioned in the storage container at such a level that the main valve seat is on essentially the same horiozntal plane as the bottom of said storage container so that essentially complete drainage of liquid can be effected. This is an important advantage in transport trucks where it is desired to completely empty the tank.

The valve structures of the invention will operate at all ambient temperatures. A very definite advantage from a safety standpoint is that the valve is essentially completely internally mounted and is thus protected from possible damage due to mechanical blows or other shock. A further advantage of this internal mounting is that space is conveniently provided for direct coupling of a pump to the valve flange, thus providing for very compact installations on transport vehicles.

Another advantage is that the valve will not contaminate any products passed therethrough since all lubrication is effected by the material being transported.

While the valve of the invention has been described primarily as a dispensing valve, its use is not so limited. The valve can be used as a loading valve and can be operated automatically in the same manner as previously described. Thus, the valve of the invention could well be the only valve in the storage tank or container of the transport vehicle and could be located in the bottom thereof for complete drainage of said vehicle.

Likewise, while the valve has been described primarily as employed in connection with transport vehicles, particularly self-propelled transport vehicles, its use is not so limited, said valve can be employed in railroad tank cars or in stationary storage tanks.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. In a valve structure comprising, in combination: a generally tubular valve body having means at one end thereof for securing said body to a container; a first chamber formed in said body adjacent said one end; a second chamber formed within said body adjacent said first chamber and having an opening in the wall thereof; a valve seat intermediate said first and second chambers; a valve head disposed in said second chamber and adapted to engage said valve seat; a hollow valve stem slidably mounted in said second chamber and attached to said valve head; a first spring mounted around said stem and acting between said stem and said valve body to normally bias said valve head out of engagement with said valve seat; a valve shaft extending from within said first chamber to within said second chamber, said shaft extending slidably through said valve head and said valve stem with a clearance providing a bleed passage connecting said first and second chambers; a lost motion connection between said valve stem and said valve shaft; means connected to said valve shaft for closing said bleed passage when said shaft is in valve closing position; a second spring mounted around said shaft and acting between said shaft and said valve body to normally bias said valve head into engagement with said valve seat; valve operating means extending into said first chamber and into engagement with said shaft for moving said shaft in a direction against the tension of said second spring to a valve opening position; the improvement comprising: holding means extending into said first chamber adjacent said valve operating means and operable to engage said valve operating means so as to hold same in engagement with said shaft.

2. A valve structure according to claim 1 wherein said holding means comprises: a cylinder connecting with a port provided in the wall of said valve body adjacent said valve operating means; a fluid actuated piston slidably disposed in said cylinder; a pin connected to one side of said piston with one end extending through said port into said valve body; and spring means for normally biasing said piston and pin assembly to a retracted position.

3. A valve structure according to claim 1 wherein said holding means comprises: a solenoid connected into a port provided in the wall of said valve body adjacent said valve operating means; a pin connected to one end of the core rod of said solenoid with the other end of said pin extending through said port into said valve body; and spring means for normally biasing said core rod and pin assembly to a retracted position.

4. In a valve structure comprising, in combination: a generally tubular valve body having means at one end thereof for securing said body to a container; a first chamber formed in said body adjacent said one end; a second chamber formed within said body adjacent said first chamber and having an opening in the wall thereof; a valve seat intermediate said first and second chambers; a valve head disposed in said second chamber and adapted to engage said valve seat; first biasing means within said second chamber for normally biasing said valve head in a direction away from said first chamber and out of engagement with said valve seat; second biasing means within said second chamber for normally biasing said valve head in a direction toward said first chamber and into engagement with said valve seat, said second biasing means being stronger than said first biasing means; a valve shaft connected to said valve head; and valve operating means extending into said first chamber and into engagement with said shaft for moving said shaft in a direction against said second biasing means to a valve opening position; the improvement comprising: holding means extending into said first chamber adjacent said valve operating means and operable to engage said valve operating means within said first chamber so as to hold same in engagement with said shaft.

5. A valve structure according to claim 4 wherein said holding means comprises: a cylinder connecting with a port provided in the wall of said valve body adjacent said valve operating means; a fluid actuated piston slidably disposed in said cylinder; a pin connected to one side of said piston with one end extending through said port into said valve body; and spring means for normally biasing said piston and pin assembly to a retracted position.

6. A valve structure according to claim 4 wherein said holding means comprises: a solenoid connected into a port provided in the wall of said valve body adjacent said valve operating means; a pin connected to one end of the core rod of said solenoid with the other end of said pin extending through said port into said valve body; and spring means for normally biasing said core rod and pin assembly to a retracted position.

7. In a valve structure comprising, in combination: a generally tubular valve body having means at one end thereof for securing said body to a container; a first chamber formed in said body adjacent said one end; a second chamber formed within said body adjacent said first chamber and having an opening in the wall thereof; a valve seat intermediate said first and second chambers; a valve head disposed in said second chamber and adapted to engage said valve seat; first biasing means within said second chamber for normally biasing said valve head in a direction away from said first chamber and out of engagement with said valve seat; second biasing means within said second chamber for normally biasing said valve head in a direction toward said first chamber and into engagement with said valve seat, said second biasing means being stronger than said first biasing means; a valve shaft connected to said valve head; a rod rotatably mounted in the wall of said first chamber adjacent one end thereof, one end of said rod being within said first chamber and adjacent one end of said shaft, the other end of said rod being without said first chamber; a cam, having an indexing means in the surface thereof, mounted on said one end of said rod and engaging said one end of said shaft; and a lever attached to said other end of said rod for rotating said rod and said cam to move said shaft in a direction against said second biasing means to a valve opening position; the improvement comprising, holding means extending into said first chamber adjacent said cam and operable to engage said indexing means so as to hold said cam in engagement with said shaft when said rod and said cam have been rotated to move said shaft to a valve opening position.

8. A valve structure according to claim 7 wherein said holding means comprises: a cylinder fitted into a recess provided in the outer wall of said valve body adjacent said one end thereof; a port extending from said recess into said valve body; a fluid actuated piston slidably disposed in said cylinder; a plunger attached at one end to one side of said piston with the other end extending without said cylinder into said recess; a cavity in said extended end of said plunger; a pin mounted in said cavity with one end extending therefrom and through said port into said valve body; a first spring disposed in said cavity for biasing said pin to an extended position; and a second spring mounted around said plunger and acting between said one side of said piston and said cylinder to normally bias said piston, plunger and pin assembly to a retracted position.

9. A valve structure according to claim 7 wherein said holding means comprises: a solenoid connected to a cylinder fitted into a recess provided in the outer wall of said valve body adjacent said one end thereof; a port extending from said recess into said valve body; a plunger in said cylinder attached at one end to one end of the core rod of said solenoid with the other end of said plunger extending without said cylinder into said recess; a cavity in said extended end of said plunger; a pin mounted in said cavity with one end extending therefrom and through said port into said valve body; a first spring disposed in said cavity for biasing said pin to an extended position; and a second spring mounted around said plunger and acting between one side of said recess and said plunger to normally bias said core rod, plunger and pin assembly to a retracted position.

References Cited in the file of this patent
UNITED STATES PATENTS

| | | |
|---|---|---|
| 616,197 | Moller | Dec. 20, 1898 |
| 1,107,022 | Block | Aug. 11, 1914 |
| 1,440,710 | Wells | Jan. 2, 1923 |
| 1,707,636 | McClung et al. | Apr. 2, 1929 |
| 1,762,965 | Ehlers | June 10, 1930 |
| 2,181,523 | Shiels | Nov. 28, 1939 |
| 2,298,233 | Ricard | Oct. 6, 1942 |
| 2,320,567 | Carlson | June 1, 1943 |
| 2,565,817 | Jurs | Aug. 28, 1951 |
| 2,630,137 | Krone et al. | Mar. 3, 1953 |
| 2,661,021 | Lautiainen | Dec. 1, 1953 |
| 2,960,106 | Dyer | Nov. 15, 1960 |